United States Patent Office 2,984,997
Patented May 23, 1961

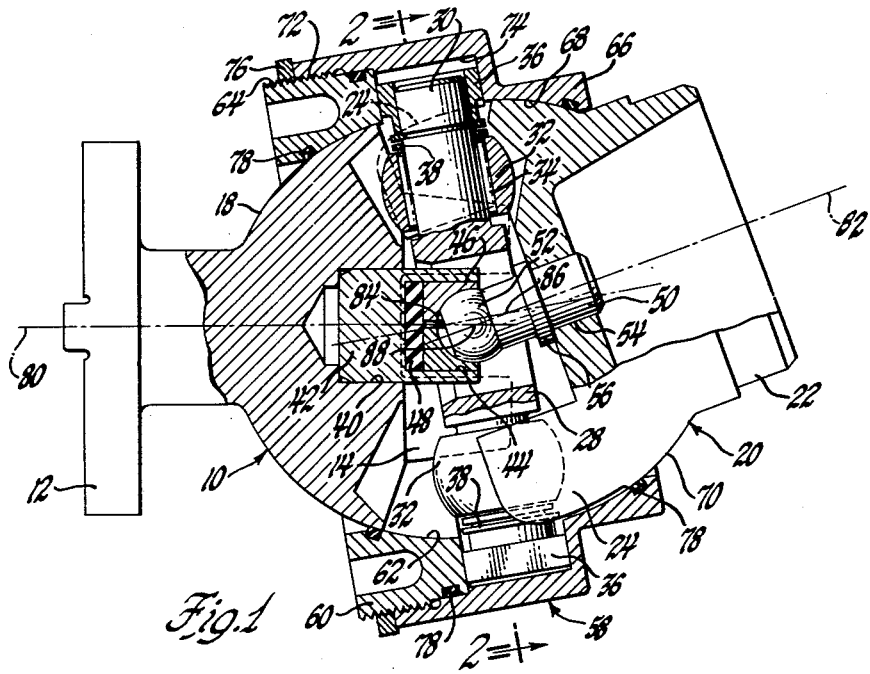

2,984,997
UNIVERSAL JOINT

Robert D. Wight, Saginaw, Mich., assignor to General Motors Corporation, Detroit, Mich., a corporation of Delaware Filed June 6, 1960, Ser. No. 34,130

4 Claims. (Cl. 64—21)

This invention relates to universal joints and more particularly to a universal joint permitting substantial constant velocity at high speeds of operation and at high degrees of angularity.

In the design and manufacture of motor vehicles, many considerations are involved in the construction and angularity of the vehicle driveline. Typical of these considerations is the desire to lower the vehicle floor or to eliminate the tunnel through the passenger compartment. One method of accomplishing this result it is to provide a driveline lower than the floor of the vehicle. This creates obvious difficulties, in that the centerline of the crankshaft of the vehicle engine and the centerline of the input shaft to the differential unit at the rear are generally as high, or higher than the vehicle floor. Consequently, a vehicle driveline to accomplish this purpose must be of a configuration to go beneath the floor, thus requiring a plurality of driveshaft sections joined by universal joints.

It is further desirable for the motor vehicle driveline to transmit torque from the engine to the rear axle at substantially constant velocity. This is generally accomplished by using a plurality of single universal joints so phased as to allow the velocity variation of one joint to be compensated for by the velocity variation of a second joint. A difficult problem arises when three universal joints are required, due to the number of driveshaft portions utilized and the angles through which the torque transmission must travel. When three universal joints are used, two of the joints may be of the single type and phased as above pointed out, but the third must be a constant velocity type of universal joint in order to permit the constant velocity torque transmission.

The most common constant velocity universal joint is a double Cardan joint which is operable through a small range of angularity. It is usually found that such universal joints are not particularly suitable for high angle torque transmission, since the joints possess inherent disadvantages making them impractical for such use. The double Cardan universal joints are generally complex items having a large number of parts and requiring a great degree of precision machining. Furthermore, because of the construction of the joints, they are relatively long in an axial direction, taking up a great deal of space and limiting the design of the driveline.

The device in which this invention is embodied comprises, generally, a universal joint which is operable through a larger angle than the double Cardan universal joint and is capable of substantially constant velocity torque transmission at a relatively high speed. The universal joint has a pair of yoke members that act in a manner similar to a pot type universal joint, however, the torque transfer from one yoke to the other is accomplished in a manner similar to a single Cardan type universal joint. A ball and socket centering device is utilized between the two yoke members, permitting high speed and high angle operation and relatively slight angular velocity variation.

With a joint of this construction, driveline design is made much less complicated, the universal join permitting a larger angle between driveshaft portions and being compact in the axial direction, taking up a limited amount of space. The slight degree of angular velocity variation introduced into the driveline by the universal joint is of such magnitude that it may be compensated for by the remaining joint or joints in the complete driveline, or may be of insufficient degree to affect the operation of the motor vehicle.

These and other advantages will become more apparent from the following description and drawings in which:

Figure 1 is an elevational view of the universal joint with parts broken away and in section, illustrating the location of the various parts during one condition of operation.

Figure 2 is a cross-sectional view of the universal joint illustrated in Figure 1 taken substantially along the line 2—2 of Figure 1 and looking in the direction of the arrows.

Referring more particularly to the drawings, the construction of the universal joint is best described with reference to Figure 1. A first yoke member, illustrated generally by the numeral 10, has a flange 12, or some other suitable means, to permit the yoke 10 to be secured to a driveshaft portion. This may be accomplished in any manner, such as by welding or bolting the driveshaft section to the flange or to the portion 12.

The yoke member 10 has two pairs of arms 14 extending axially from the body of the yoke member 10 and in a direction opposite to the flange 12. The pairs of arms 14 are provided with longitudinal cylindrical grooves 16, the purpose for which will be later described. The outer surface 18 of the yoke member 10 is spherically formed to permit the relative angular movement of the entire joint structure, in a manner to be hereinafter described.

A second yoke member, illustrated generally by the numeral 20, is substantially the same as yoke member 10, and having some suitable means for securement to a second driveshaft portion. This may take the form of an annular portion of decreased diameter 22 over which a tubular driveshaft section may be received and welded.

Yoke member 20 has a pair of arms 24 extending axially in a direction opposite to the portion 22 and in the direction of the first yoke member 10. It may be noted from Figure 2 that the pairs of arms 14 and 24 extending from the yoke members 10 and 20 are disposed at substantially 90° intervals, with the arms 24 of yoke member 20 being illustrated in Figure 2 at the upper and lower positions and the arms 14 of yoke member 10 being illustrated in the right and left position. Arms 24 are also provided with cylindrical grooves 16, the purpose for which will be later described.

In order to transmit driving torque from yoke member 10 to yoke member 20, a spider or cross-shaft construction is utilized. The spider, illustrated generally by the numeral 26, is provided with a central ring 28 to which are secured a plurality of stub shafts 30 in any suitable manner. It is to be understood that the entire spider assembly may be of integral construction or the stub shafts 30 may be bolted or otherwise secured to the central ring 28. As shown in Figure 2 the stub shafts 30 of the spider 26 extend through the cylindrical grooves 16 in each of the yoke arms 14 and 24.

Mounted on each of the stub shafts 30 is a bearing sleeve and bearing assembly. A spherically surfaced sleeve 32 having a diameter substantially the same as the diameter of the cylindrical grooves 16 in the yoke arms 14 and 24, is received in these grooves. Bearing sleeves 32 are permitted relatively frictionless rotation about the stub shafts 30 by annuli of needle bearings 34, disposed between each bearing sleeve 32 and the stub shaft 30 with which it is associated.

The bearing sleeves 32 are received within the cylindrical grooves 16 and permit sliding of the spider and bearing assembly relative to the arms 14 and 24. This permits relative angularity of the two yoke members 10 and 20.

Also mounted on each of the stub shafts 30 is a shoe 36 having a cylindrical outer surface and which is disposed outboard of the yoke arm with which it is associated. The bearing sleeves 32, needle bearings 34 and shoes 36 are secured and retained on the stub shaft 30 in any suitable manner, such as by retaining rings 38.

A centering device is provided for the universal joint which serves to maintain the yoke members 10 and 20 in their proper spaced relationship. An axial bore 40, formed in the center of yoke member 10 and between the arms 14, receives a block 42, which in turn has a cylindrical bore 44 formed axially therein. Block 42 receives the socket means 46 for the centering assembly.

Socket means 46 may be of a number of different configurations. Examples of suitable constructions are illustrated and described in United States patent applications Serial No. 783,536 and Serial No. 835,216, now Patent No. 2,947,158. The socket member 46 is illustrated in Figure 1 as being of the split type, although this is not necessarily the preferred configuration.

Disposed between the inner end of the socket member 46 and the bottom of the bore 44 in block 42 is a spring member of suitable configuration, such as the rubber block 48 illustrated in Figure 1. It is to be understood that any suitable resilient means could be provided, such as a coil spring, Belleville spring or any other suitable resilient means capable of biasing the socket member 46 in an outward direction or to the right as viewed in Figure 1.

Secured centrally in the yoke member 20 is a stud, illustrated generally by the numeral 50, having a portion of a spherical ball 52 formed on the inner, or left-hand, end thereof. Ball portion 52 is received in the socket member 46 and is freely rotatable in any direction therein. The stud 50 is received in an axial bore 54 formed centrally in a yoke member 20 and a radial flange 56, formed intermediate the ends of the stud 50, properly positions the stud in the yoke member 20. The stud may be secured to the yoke member in any suitable manner, such as by a press fit or by welding.

It is preferred that the socket means 46 be such as to take up manufacturing tolerances and wear between the means 46 and the bore 44 and between the means 46 and the ball 52. This may be accomplished by the split construction illustrated in Figure 1.

In order to connect the two yoke members 10 and 20 and to properly position the spider assembly 26, a cover, illustrated generally by the numeral 58, is disposed around the outside of the yoke members 10 and 20. The cover is shown to be of two-piece construction, the portion illustrated by the numeral 60 being a generally cylindrical ring having an inner spherical surface 62 corresponding to the spherical surface 18 formed on yoke member 10. Ring 60 is also provided with an external thread 64 to provide a connection with the second cover member, illustrated generally by the numeral 66. Cover member portion 66 has a spherical inner surface 68 adapted to engage the external spherical surface 70 formed on the yoke member 20 and portion 66 has an internal thread as at 72 to engage the external thread 64 of cover portion 60. It may be seen that the two portions 60 and 66, when properly secured together, will retain the yoke members 10 and 20 in the proper spaced relation and further permit relative angular movement of one yoke member with respect to the other.

When the cover members 60 and 66 are properly assembled, an annular groove 74 is provided which receives the shoes 36 disposed on the ends of the stub shafts 30 of the spider 26. It will hereinafter be seen that the annular groove 74 and the shoes 36 place the plane of the spider assembly 26 in the homokinetic plane of the universal joint to provide substantially constant velocity torque transmission.

In order to properly locate the cover portions 60 and 66 together, a lock nut 76 may be provided and received on the external threads 64 formed on cover member 60. Suitable seals, such as O-rings 78, may be provided at proper points between the cover members and the universal joint yokes 10 and 20 in order to prevent the entry of dirt and foreign materials and to seal the inner portions of the universal joint.

With the parts in the position illustrated in Figure 1, it is desired to transmit driving torque from the driveshaft portion attached to flange 12 to the driveshaft portion attached to yoke 20 through the section of decreased diameter 22. The driveshaft portions will have centerlines corresponding to those of yoke members 10 and 20, identified by numerals 80 and 82 respectively in Figure 1, and the angle reached may vary to any suitable degree. However, once the angle is fixed, the centerlines 80 and 82 remain unchanged with respect to each other and the universal joint operates on these axes. It may be noted that the center of the outer spherical surface 18 of yoke member 10 is at a point illustrated by numeral 84 and the center of the spherical surface 72 of yoke member 20 is at a point illustrated by the numeral 86. When the yoke members 10 and 20 are in relative angularity, the yokes must pivot at point 88, the center of the ball portion 62 which is equidistant between points 84 and 86. Point 88 also lies on the centerline of the groove 74 formed between the cover members 60 and 66 and it is easily seen that the spider assembly 26, being restricted in its angular movement by the groove 74, is positioned such that the plane of its center passes through the point 88, bisecting the angle formed by centerlines 80 and 82. This is the homokinetic plane of the universal joint. Since the centers of the yoke members 10 and 20 and the cover assembly 58 are separated, the cover assembly cannot be placed in angularity without the yoke members 10 and 20 being placed in angularity. Groove 74, therefore, must always be perpendicular to a line connecting point 84 and 86 and since point 88 is equidistant between points 84 and 86, groove 74, and consequently spider assembly 26, lie in the homokinetic or bisecting plane.

Thus, as yoke member 10 is rotated by its associated driveshaft portion, yoke arms 14 acting on the bearing sleeves 32 and the spider stub shafts 30 transmit the driving torque to yoke arms 24 of the yoke member 20 and consequently to the driveshaft portion with which it is associated. The centering ball 52 and centering socket 46 maintain the proper angularity between the centerlines 80 and 82 and provide a center of rotation, 88, for the universal joint. Shoes 36, secured in the groove 74, maintain the spider assembly 26 in its proper angularity with respect to yoke members 10 and 20, and the spherical surfaces of the bearing sleeves 32 permit sliding movement between the bearing sleeves 32 and the cylindrical grooves 16 formed in the yoke arms 14 and 24, such that as the universal joint is rotated, the yoke arms are permitted the necessary oscillatory movement with respect thereto.

Thus, it may be seen that a relatively simple and uncomplicated universal joint is provided which is capable of high speed operation and high angle torque transmission with substantially little velocity variation of the torque transmitted therethrough. It may be seen that the universal joint is of desirable size when compared to other double constant velocity type universal joints, permitting a greater degree of latitude in the design and manufacture of motor vehicle drivelines.

What is claimed:

1. A universal joint comprising a pair of yoke members having spherical outer surfaces formed thereon and arms extending therefrom and towards each other, a spider and bearing assembly received in said arms and slidable and rotatable therein, said assembly transmitting torque from one of said yoke members to the other of said yoke members, resiliently biased centering means secured in said yoke members and including a socket secured in one of said yoke members and a ball secured to the other of said yoke members and received in said socket, said ball and said socket maintaining said yoke members in proper spaced relationship during operation of said universal joint, a cover member received over said yoke members and having a spherical inner surface engaging said spherical outer surfaces of said yoke members to prevent said yoke members from separating, said cover member having an internal annular groove formed centrally therein, said groove receiving said spider and bearing assembly and retaining said spider and bearing assembly in a plane substantially bisecting the angle between the longitudinal axes of said yoke members.

2. A universal joint comprising a pair of yoke members having spherical outer surfaces formed thereon and arms extending axially therefrom and toward each other, said arms having cylindrical longitudinal grooves formed therein, a spider and bearing assembly disposed between said yoke members and including spherically surfaced bearing sleeves slidable and rotatable in said cylindrical grooves in said arms to transmit torque from one of said yoke members to the other of said yoke members and to allow relative angular movement between said yoke members, resiliently biased centering means secured in said yoke members and including a socket secured in one of said yoke members and a ball secured to the other of said yoke members and received in said socket, said ball and said socket maintaining said yoke members in proper spaced relationship during operation of said universal joint, a cover member received over said yoke members and having a spherical inner surface engaging said spherical outer surfaces of said yoke members to prevent said yoke members from separating, said cover member having an internal annular groove formed centrally therein, said groove receiving said spider and bearing assembly and retaining said spider and bearing assembly in a plane substantially bisecting the angle between the longitudinal axes of said yoke members.

3. A universal joint comprising a pair of yoke members having spherical outer surfaces formed thereon and arms extending axially therefrom and towards each other, said arms having cylindrical longitudinal grooves formed therein, a spider and bearing assembly disposed between said yoke members and including spherically surfaced bearing sleeves slidable and rotatable in said cylindrical grooves in said arms to transmit torque from one of said yoke members to the other of said yoke members and to allow relative angular movement between said yoke members, a socket retaining member secured in the center of one of said yoke members and between the arms thereof, said member having an axial bore formed therein, socket means received in said bore and having a substantially spherical opening formed therein, resilient means between said socket retaining member and said socket means and biasing said socket means axially outwardly of said bore, a spherical ball extending from the other of said yoke members and into said spherical opening and retained in engagement therewith by said resilient means, a cover member received over said yoke members and having a spherical inner surface engaging said spherical outer surfaces of said yoke members to prevent said yoke members from separating, said cover member having an internal annular groove formed centrally therein, said groove receiving said spider and bearing assembly and retaining said spider and bearing assembly in a plane substantially bisecting the angle between the longitudinal axes of said yoke members.

4. A universal joint comprising a pair of yoke members having spherical outer surfaces formed thereon and arms extending therefrom and toward each other, a spider and bearing assembly received in said arms and slidable and rotatable therein, said assembly transmitting torque from one of said yoke members to the other of said yoke members, a socket retaining member secured in the center of one of said yoke members and between the arms thereof, said member having an axial bore formed therein, socket means received in said bore and having a substantially spherical opening formed therein, resilient means between said socket retaining member and said socket means and biasing said socket means axially outwardly of said bore, a spherical ball extending from the other of said yoke members and into said spherical opening and retained in engagement therewith by said resilient means, a cover member received over said yoke members and having a spherical inner surface engaging said spherical outer surfaces of said yoke members to prevent said yoke members from separating, said cover member having an internal annular groove formed centrally therein, said groove receiving said spider and bearing assembly and retaining said spider and bearing assembly in a plane substantially bisecting the angle between the longitudinal axes of said yoke members.

References Cited in the file of this patent

UNITED STATES PATENTS

| | | |
|---|---|---|
| 1,450,805 | Hart-Spratt | Apr. 3, 1923 |
| 2,640,335 | Wingquist | June 2, 1953 |

FOREIGN PATENTS

| | | |
|---|---|---|
| 566,301 | Great Britain | Dec. 21, 1944 |